(12) United States Patent
Kaiser et al.

(10) Patent No.: US 7,978,748 B2
(45) Date of Patent: Jul. 12, 2011

(54) SYNCHRONIZATION BAND SELECTION OF A FREQUENCY HOPPING WIRELESS RECEIVER

(75) Inventors: Daryl Arnold Kaiser, Los Gatos, CA (US); Sujai Chari, San Francisco, CA (US)

(73) Assignee: NDSSI Holdings, LLC, San Jose, CA (US)

( * ) Notice: Subject to any disclaimer, the term of this patent is extended or adjusted under 35 U.S.C. 154(b) by 813 days.

(21) Appl. No.: 12/001,339

(22) Filed: Dec. 11, 2007

(65) Prior Publication Data

US 2009/0147830 A1   Jun. 11, 2009

(51) Int. Cl.
*H04B 1/73* (2006.01)
(52) U.S. Cl. ........ 375/137; 375/132; 375/133; 375/134; 375/135; 375/136
(58) Field of Classification Search ........... 375/132–137
See application file for complete search history.

(56) References Cited

U.S. PATENT DOCUMENTS

| | | | | |
|---|---|---|---|---|
| 6,501,785 | B1 * | 12/2002 | Chang et al. | 375/133 |
| 6,954,465 | B2 * | 10/2005 | Chang et al. | 370/442 |
| 7,782,986 | B2 * | 8/2010 | Voglewede et al. | 375/346 |
| 2006/0007986 | A1 | 1/2006 | Larsson | |
| 2006/0203925 | A1 | 9/2006 | Pirooz et al. | |
| 2007/0064744 | A1 | 3/2007 | Aytur et al. | |
| 2007/0281743 | A1 | 12/2007 | Palin et al. | |
| 2009/0103591 | A1 | 4/2009 | Chari et al. | |

* cited by examiner

*Primary Examiner* — Leon Flores
(74) *Attorney, Agent, or Firm* — Brian R. Short (57) ABSTRACT

Methods and systems of a receiver selecting a subset of plurality of frequency hopping bands for synchronization of the receiver are disclosed. One method includes the receiver determining a receive signal quality metric for each band of the plurality of frequency hopping bands, and selecting at least one synchronization band as a subset of the plurality of frequency hopping bands for synchronization based on the receive signal quality metric of each of the plurality of frequency hopping bands.

21 Claims, 7 Drawing Sheets

SYNCHRONIZATION BAND SELECTION OF A FREQUENCY HOPPING WIRELESS RECEIVER

FIELD OF THE DESCRIBED EMBODIMENTS

The described embodiments relate generally to wireless communications. More particularly, the described embodiments relate to a method and apparatus for synchronization band selection of a frequency hopping wireless receiver.

BACKGROUND

Accurate packet synchronization is a prerequisite to establishing reliable communication over wireless links. A common approach to achieve synchronization involves the transmitting of a synchronization sequence, also referred to as a preamble, prior to the transmission of the payload. The synchronization sequence has special properties that improve the receiver's ability to combat the effects of channel dispersion, noise and interference.

One form of wireless communication is wireless communication transmitted and received according to the ultra-wide band (UWB) protocol. The Federal Communications Committee (FCC) has mandated that UWB radio transmission can legally operate in the frequency range of 3.1 GHz to 10.6 GHz. The transmit power requirement for UWB communications is that the maximum average transmit Effective Isotropic Radiated Power (EIRP) is −41.25 dBm/MHz in any transmit direction.

The result of the low transmission signal power and wide bandwidth can cause UWB signals to suffer from low signal to interference and noise ratios (SINR). Additionally, UWB signals can suffer from high signal dispersion. That is, the UWB signals can have multiple signal paths within an RF transmission channel between the transmitter and the receiver causing each transmitted impulse to spread out into multiple impulses over time. Low SNR and high signal dispersion signals can make the previously described packet synchronization difficult.

It is desirable to have a method of selecting one or more of frequency hopping bands for monitoring and establishing synchronization of wireless signals.

SUMMARY

An embodiment includes a method of a receiver selecting a subset of plurality of frequency hopping bands for synchronization of the receiver. The method includes the receiver determining a receive signal quality metric for each band of the plurality of frequency hopping bands, and selecting at least one synchronization band as a subset of the plurality of frequency hopping bands for synchronization based on the receive signal quality metric of each of the plurality of frequency hopping bands.

Another embodiment includes a method of a receiver selecting a subset of plurality of frequency hopping bands for synchronization of the receiver. The method includes the receiver obtaining a priori knowledge of at least one of interference and the signal quality of the frequency hopping bands, and selecting at least one synchronization band as a subset of the plurality of frequency hopping bands for synchronization based on the interference and signal quality of each of the plurality of frequency hopping bands.

Other aspects and advantages of the described embodiments will become apparent from the following detailed description, taken in conjunction with the accompanying drawings, illustrating by way of example the principles of the described embodiments.

DETAILED DESCRIPTION

The embodiments described include methods of selecting a subset of frequency hopping bands for packet synchronization. The selected synchronization bands can be monitored for a signal of interest. If a signal of interest is detected, synchronization can be declared if the signal of interest satisfies a quality metric when receiving the signal of interest through an ordered sequence of bands.

Figure 1:
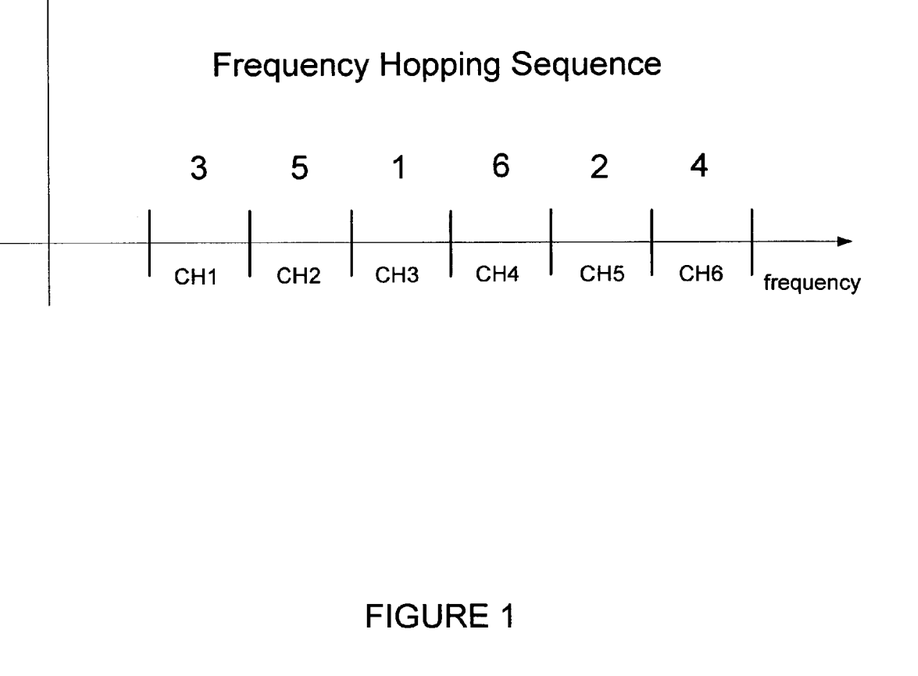
FIG. 1 shows a frequency spectrum of frequency bands, and an example of a sequence for transmission of data symbols within these bands.

FIG. 1 shows a frequency spectrum of communication frequency bands (hereafter referred to, interchangeably, as frequency hopping bands or frequency bands), and an example of a sequence of frequency bands for transmission of data symbols. As shown, this example includes six communicating frequency bands (labeled CH1 through CH6) that are defined by a frequency hopping sequence. Frequency-hopping is a method of transmitting radio signals by switching a carrier among many frequency bands, using a deterministic or pseudorandom sequence known to both transmitter and receiver. In this example, symbols of the signal are transmitted such that the energy of the first symbol occupies frequency band 3, the next symbol's energy occupies frequency band 5 and so forth. After the sixth symbol, which occupies frequency band 4, the pattern may repeat or it may be followed with a continuation of a pseudorandom sequence.

An embodiment of UWB uses multi-carrier (orthogonal frequency division multiplexing (OFDM)) signals. The OFDM signals are transmitted according to a frequency hopping sequence.

Figure 2:
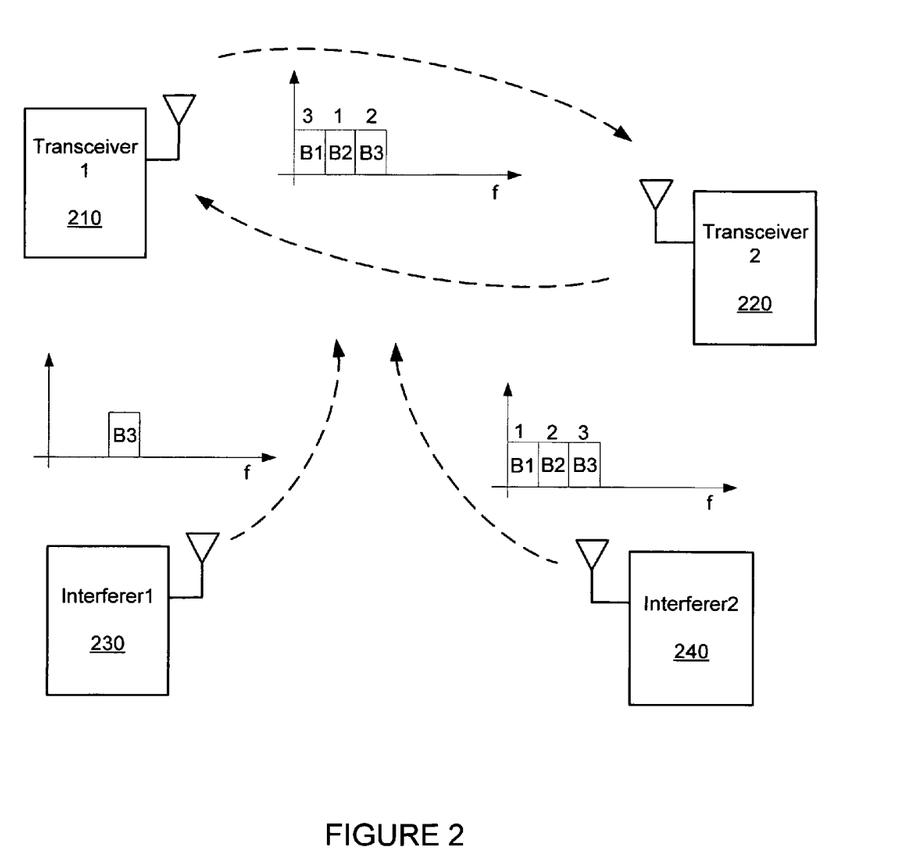
FIG. 2 shows a pair of wireless transceivers that can receive interference from interfering transmitters that can influence the establishment of synchronization between the pair of wireless transceivers.

FIG. 2 shows a pair of wireless transceivers 210, 220 that can receive interference from interfering transmitters 230,

240. As shown, the transceivers 210, 220 communicate by wireless transmission through a frequency hopping sequence of bands. For example, as shown, the frequency hopping sequence can be through three bands (B1, B2, B3) in the order shown (3, 1, 2). That is, the exemplary sequence of bands is B2, B3, and then B1. The interfering transmitter 230 transmits in band B3, and the interfering transmitter 240 transmits in bands B1, B2, B3 in the order 1, 2, 3 as shown.

For an embodiment, synchronization is initially established by a receiver monitoring a single one of the frequency hopping bands. If a signal of interest (SOI) is detected, a synchronization sequence can be initiated to establish synchronization of the receiver to the SOI. However, blindly selecting the band for monitoring reception of the SOI may not provide optimal synchronization. That is, for example, if the third band (B3) is selected as the band to be monitored for the SOI, the interferer 130 may reduce the receiver's ability to detect the SOI. If the second band (B2) suffers from less noise and interference, then the second band (B2) is probably a better band to monitor for the SOI.

For many wireless signals (including UWB), the receive signal includes packets that include a synchronization signal followed by header and payload signals. A designated synchronization band (for example, the band suffering from the least amount of interference and noise) can be monitored. Upon detection of a synchronization signal within the designated synchronization band, the receiver can initiate hopping to other frequency bands as determined by timing information obtained during the synchronization process and the predetermined frequency hopping sequence of the detected SOI.

The synchronization detection is typically spread over several frequency hopping bands as determined by selected synchronization bands. Interfering signals typically vary in their levels of interference between different bands.

As will be described, once a SOI is detected, synchronization is established by the receiver by correlating the received signal with a known synchronization sequence. For example, the known sequence can include OFDM symbol data known a priori by both the transmitter and the receiver. The transmitter transmits synchronization signals according to the a priori OFDM symbol sequence which can be detected by the receiver to establish synchronization. Based on the output of the correlation, the receiver can declare synchronization. That is, for example, if the magnitude squared of the correlation output includes signal peaks greater than a predetermined threshold, synchronization is declared. The reliability of the synchronization can be additionally improved if the magnitude of the correlation output is normalized by the signal power of the received signal prior to the comparison with the predetermined threshold.

The detection of a SOI initiates a synchronization procedure. The synchronization procedure includes performing the correlation of the received signal on an ordered sequence of synchronization bands in which the synchronization bands are a subset of the frequency hopping bands. Embodiments of selecting the ordered sequence are dependent on the received signal quality of each of the frequency hopping bands, the sequence of the frequency hopping bands, and/or processing latency of the correlation circuitry.

As described, an initial band is monitored for a SOI. Once the SOI has been detected, the synchronization process is initiated. As described, an embodiment includes establishing synchronization in the initial band (the initial band being selected based on the signal quality of each of the frequency hopping bands), and then establishing synchronization in the ordered sequence. The synchronization processing, for example, correlating the received SOI with a known synchronization sequence, takes processing time. This latency (processing time) can influence the ordered sequence. That is, the frequency hopping sequence may suggest establishing synchronization in the band that comes after the initial band, but the synchronization processing time (latency) may require the receiver to establish synchronization in a later band, thereby influencing the ordered sequence of synchronization determination. This latency can be used, for example, to strategically place a poor signal quality frequency hopping band to be missed by the ordered sequence of the synchronization process.

Figure 3A:
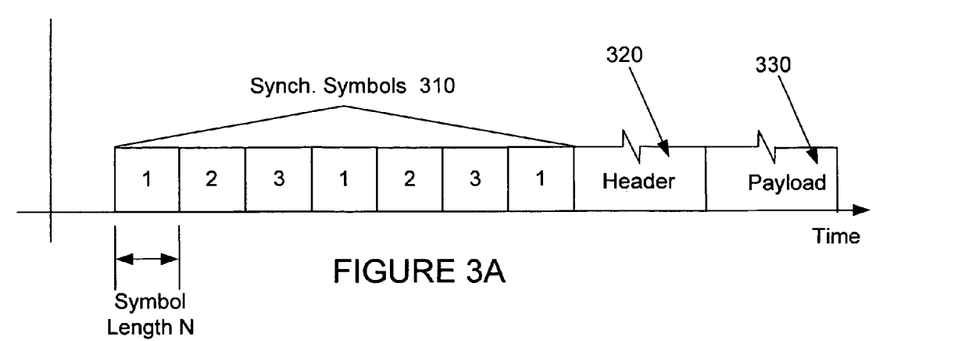
FIG. 3A shows a time-line of an example of a packet of a received wireless signal.

FIG. 3A shows a time-line of an example of a packet 310 of a received wireless signal. As shown, the packet 310 includes a series of synchronization symbols (labeled 1, 2, 3) a header 320 and a payload 330.

Figure 3B:
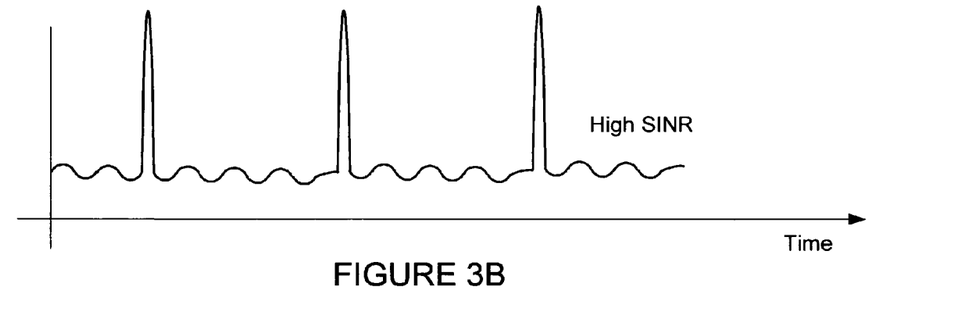
FIG. 3B shows a time-line of a correlation output of the received wireless signal when the received signal is subject to low noise and interference.

FIG. 3B shows a time-line of a correlation output of the received wireless signal when the received signal is subject to low noise and interference. As shown, the correlation output includes "peaks" that are used to establish synchronization. The peaks of the high SINR received signal are compact and include well defined peaks.

Figure 3C:
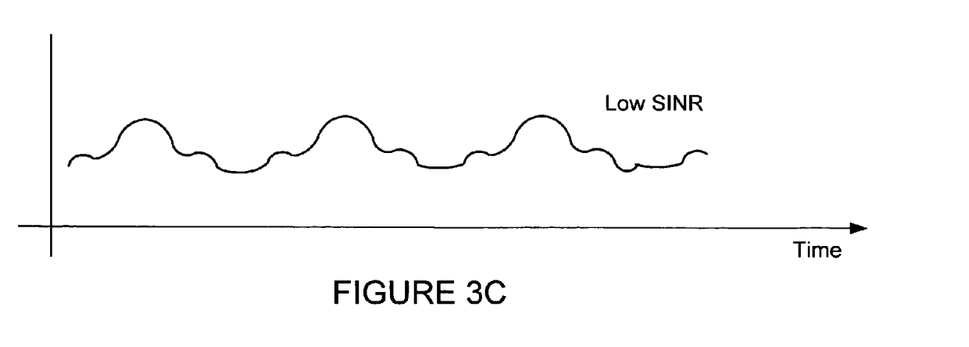
FIG. 3C shows a time-line of a correlation output of the received wireless signal when the received signal is subject to high noise and interference.

FIG. 3C shows a time-line of a correlation output of the received wireless signal when the received signal is subject to high noise and interference. As shown, the correlation output includes "peaks" that are used to establish synchronization. The peaks of the low SINR received signal are less-compact and include undefined peaks. It should be noted that other correlation outputs can include "false" peaks due to noise and interference that can cause "false" synchronization declarations. False declarations of synchronization can cause opportunities to detect synchronization with the desired signal to be missed.

A common approach to synchronization is to correlate the received signal with the known transmitted synchronization sequence. The resulting correlation gain improves the ability to detect the SOI overcoming the impairments of dispersion, noise and interference.

A synchronization quality metric can be defined by C/P (C divided by P) where C represents a correlation output magnitude squared, and P represents an average power of receive samples of the receiver. The receiver monitors the values of the C/P of the initial synchronization band. If the SOI is detected and the C/P satisfies a synchronization criteria (for example, C/P exceeds a threshold) the receiver switches to monitoring synchronization of the next of the ordered sequence of synchronization bands. Synchronization of the receiver can be declared if the received signal of subsequent synchronization bands satisfies the synchronization criteria.

Figure 4:
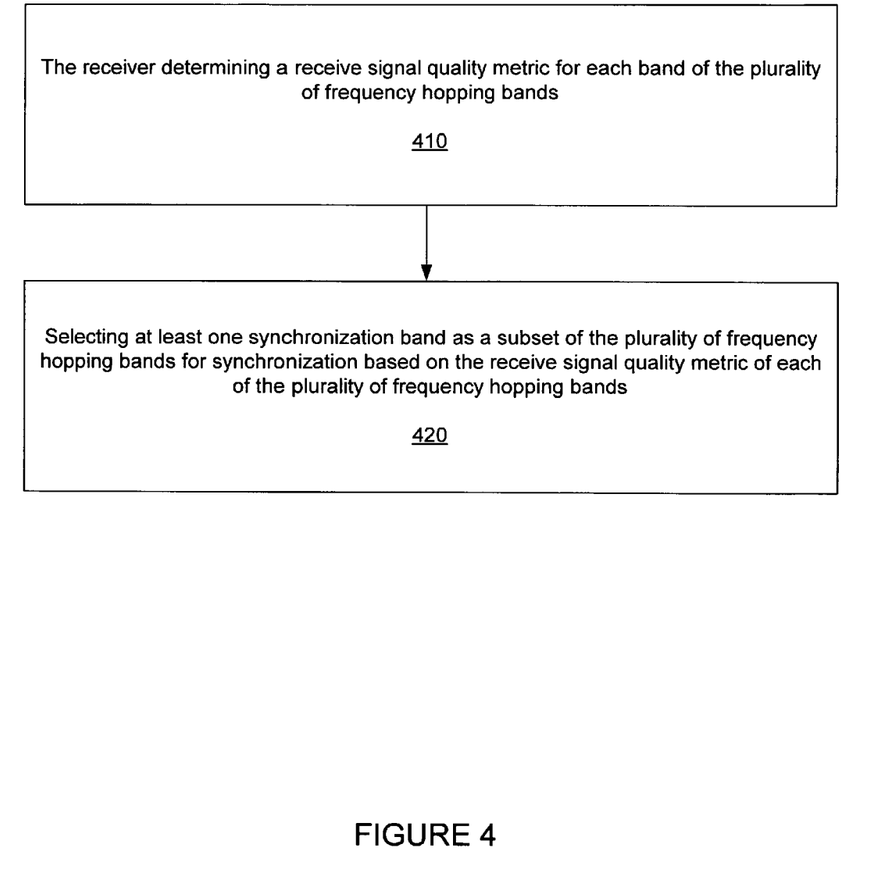
FIG. 4 is a flow chart that shows one example of steps of a method of a receiver selecting a subset of plurality of frequency hopping bands for synchronization of the receiver.

FIG. 4 is a flow chart that shows one example of steps of a receiver selecting a subset of plurality of frequency hopping bands for synchronization of the receiver. A first step 410 includes the receiver determining a receive signal quality metric for each band of the plurality of frequency hopping bands. A second step 420 includes selecting at least one synchronization band as a subset of the plurality of frequency hopping bands for synchronization based on the receive signal quality metric of each of the plurality of frequency hopping bands.

Once one or more synchronization bands have been selected, the synchronization bands are monitored for a SOI. If a single synchronization band is selected, that single band is monitored. An embodiment includes selecting the synchronization band as the frequency hopping band that has a best receive signal quality metric. The receive signal quality metric can be an SNR (signal to noise ratio) measurement, but other embodiments include other receive signal quality metrics as will be described.

Another embodiment includes selecting the at least one synchronization band by selecting a subset of the frequency hopping bands having a highest receive signal quality metric. For one embodiment, the selection includes a subset of the frequency hopping bands having a receive signal quality metric above a threshold. Another embodiment includes selecting a band, wherein synchronization initiated at the band avoids a worst signal quality band. The avoidance of a band is dependent to some extent on the synchronization procedure. For example, the previously described processing latency can be strategically used to avoid a worst quality frequency hopping band by placing the worst quality band after, for example, the first synchronization band. Therefore, the processing latency prevents monitoring of the worst quality frequency hopping band.

The selected one or more synchronization bands can vary over time. For example, if a SOI is not detected after a predetermined period of time, a new one or more synchronization bands can be selected.

Once a SOI has been detected, the receiver initiates the synchronization procedure. An embodiment of the synchronization procedure includes the receiver switching between bands based on the timing information and the predetermined hopping sequence.

As previously described, the initial band of the predetermined switching sequence is selected based on the signal quality of receive signals of each of the frequency hopping bands. As previously described, after one or more synchronization bands have been selected, the synchronization bands are monitored for a SOI. Once a SOI has been detected, a synchronization procedure is initiated. The synchronization procedure includes selecting an order of the synchronization bands. One embodiment includes selecting an order of the synchronization bands according to the receive signal quality metric of each of the synchronization bands. Once the order has been selected, a synchronization quality metric is measured for each of the ordered synchronization bands. As previously shown and described, one embodiment includes the synchronization quality metric being determined by the amplitude and focus of peaks of a correlation output signal.

The monitoring of the synchronization bands includes declaring synchronization if certain conditions of the received SOI exist. That is, generally, if the SOI is detected present, and the quality of the SOI detected to have high enough quality in a predetermined sequence of frequency hopping bands, synchronization of the receiver with the SOI can be declared.

An embodiment includes weighting each synchronization band based on the receive signal quality metric of the synchronization band. The synchronization quality metric is adjusted for each of the ordered synchronization bands based on the weighting of each of the ordered synchronization bands. The weighted synchronization quality metrics of the ordered synchronization bands are combined. Synchronization is declared if the combined weighted synchronization quality metrics exceed a predetermined threshold. As previously described, the synchronization metric can be, for example, C/P. Generally, a higher weighting is given to bands having a higher signal quality metric, and lower weightings are given to bands having a lower signal quality metric.

Additionally, another embodiment includes synchronization being declared when the synchronization quality metric of each of the ordered synchronization bands exceeds an adaptive band dependent threshold. For this embodiment, the adaptive band dependent threshold is updated over time based on the signal and/or synchronization quality metric variation over time.

As previously described, for one embodiment, the receive signal quality is determined by the receiver based on an SNR measurement. Other embodiments determine the signal quality based on an SINR (signal to interference-plus-noise ratio) measurement, a time variance of an SINR measurement, and/or a channel dispersion measurement (the channel dispersion measurement can be of the SOI, or of an interfering signal).

The channel display spread can be reflected by a root-mean-square (RMS) delay spread measurement. Alternatively, given an impulse response of the channel, the channel dispersion can be defined as the span of time that includes a given percentage (for example, 85%) of the channel energy.

The signal quality values assigned by the receiver vary directly with SNR and SINR; they vary inversely with the variance of SINR and channel dispersion of the SOI; they vary directly with the channel dispersion of an interfering signal. The inverse relationship with the variance of SINR reflects the fact that higher variance indicates time-varying impairment, which detracts from signal quality. The inverse relationship with channel dispersion on the SOI reflects the fact that higher dispersion on the SOI reduces the C/P, which reduces the synchronization quality. The direct relationship with channel dispersion of the interferer reflects the fact that higher dispersion on the interferer reduces the interfering C/P, which lowers the possibility of falsely synchronizing to the interfering signal.

As an illustration that channel dispersion can in some situations be the definitive measurement, in certain circumstances, the SNR and/or interference for a given band A, may be higher than the SNR/interference for a second given band B. However, it is possible that the channel dispersion for Band B is substantially lower than that for Band A, and therefore, B and B is chosen as the preferred band for synchronization.

The characteristics of the interfering signal can vary considerably based on the source of the interference. For UWB systems, examples of interferers include WiMax and other UWB interferers. Interference from WiMax signals typically affects a few subcarriers of the UWB signal. The interfering WiMax signal is uncorrelated with respect to the desired UWB signal and can be approximated as Gaussian noise. In contrast, interference from other UWB sources are typically wideband and affects complete frequency bands of the desired UWB signal. Knowing that particular WiMax signals and other UWB signals can be used as a priori knowledge.

The noise and interference suffered by wireless signals can vary over time. Accordingly, the selection of the one of more synchronization band of the plurality of frequency hopping bands for synchronization can be adaptively selected based on repeated measurements of the receive signal quality metric of each of the plurality of frequency hopping bands. Alternatively, the noise and interference can be determined by the receiver utilizing priori knowledge of at least one of interference and the signal quality of the frequency hopping bands. As previously described, a priori knowledge can include knowledge of the types of proximate interferers, such as, WiMax signals and/or other UWB signals.

If there is no a priori knowledge about the interference, then blind interference detection techniques can be applied. Generally speaking, these techniques utilize knowledge of the SOI and other known impairments (e.g. thermal noise, spurs, etc.) and attempt to determine distinguishing characteristics in the received signal which cannot be attributed to the known SOI or the known impairments. For instance, interference from WiMax signals typically affects a few subcarriers of the UWB signal. In contrast, interference from other UWB sources are typically wideband and affects complete frequency bands of the desired UWB signal.

Static interference detection techniques will be presented below. Dynamic interference detection techniques (i.e., techniques for detecting time-varying interference) utilize the static detection techniques combined with monitoring of various statistics over time.

Interference detection can be performed in the presence of the SOI or during quiet periods when there is no SOI being transmitted. In the case where there is no SOI, two approaches to detecting the interference include energy detection and coherent detection.

Energy detection involves estimating the received signal energy over time. When there is no SOI, the received signal power is due to thermal noise and other known receiver induced impairments whose power can be pre-determined and referred to as the background noise power. However, if there is interference present, the interfering signal is not correlated with the thermal noise and receiver induced impairments and consequently, the measured received signal power, is the sum of the background noise power and the received signal power due to interference. Therefore, the estimate of the interference power level can be obtained by subtracting the background signal power from the total measured received signal power.

If the SOI uses frequency hopping, then the interference power level can be estimated for each frequency band using the aforementioned approach. Specifically, the receiver can be configured to measure the signal power in a given band. Once the interference power has been estimated for that band, the receiver can proceed to measure the next band and repeat the procedure until an independent interference power level estimate has been obtained for each frequency band.

When there are multiple interferers or when the received interference power is less than the background noise power, energy detection may not provide accurate estimates of the interference level. In these cases, it may be beneficial to use coherent detection. One example of coherent detection is based on correlating the received signal with a known synchronization sequence transmitted by the interferer. The correlation output of the received signal with the synchronization sequence will suppress the background noise and other interferers. The power of the correlation output over a pre-determined interval can be used as an approximation of the power of the interference.

Interference levels can also be estimated in the presence of the SOI. In order to obtain accurate estimates, the SOI power must be estimated and subtracted from the total received signal power. The SOI power can be more accurately estimated when the interference is not present by using the approach described above for estimating interference when the SOI is not present. Alternatively, the channel estimates obtained for the SOI can be used to approximate the power of the SOI:

$$\hat{P}_s = g_0 \sum_{k=1}^{M} |\hat{H}_k|^2$$

where $\hat{H}_k$ is the channel estimate for subcarrier k, and $g_o$ is a constant determined based on known transmit power of the SOI and the gain in the receiver.

Note that in order for the channel estimates to be accurate, the channel estimates must be determined when the interference is not present or be sufficiently averaged across many symbols so that the interference does not corrupt the estimate.

Since the channel estimate approach characterizes the SOI signal power in each subcarrier, it can also characterize the frequency components of the interference. If the interference is identified as narrowband, that is, it occupies a small subset of subcarriers, an appropriately designed receiver can take advantage of this fact by weighting the affected subcarriers less heavily than other subcarriers when decoding the information in the SOI.

Figure 5:
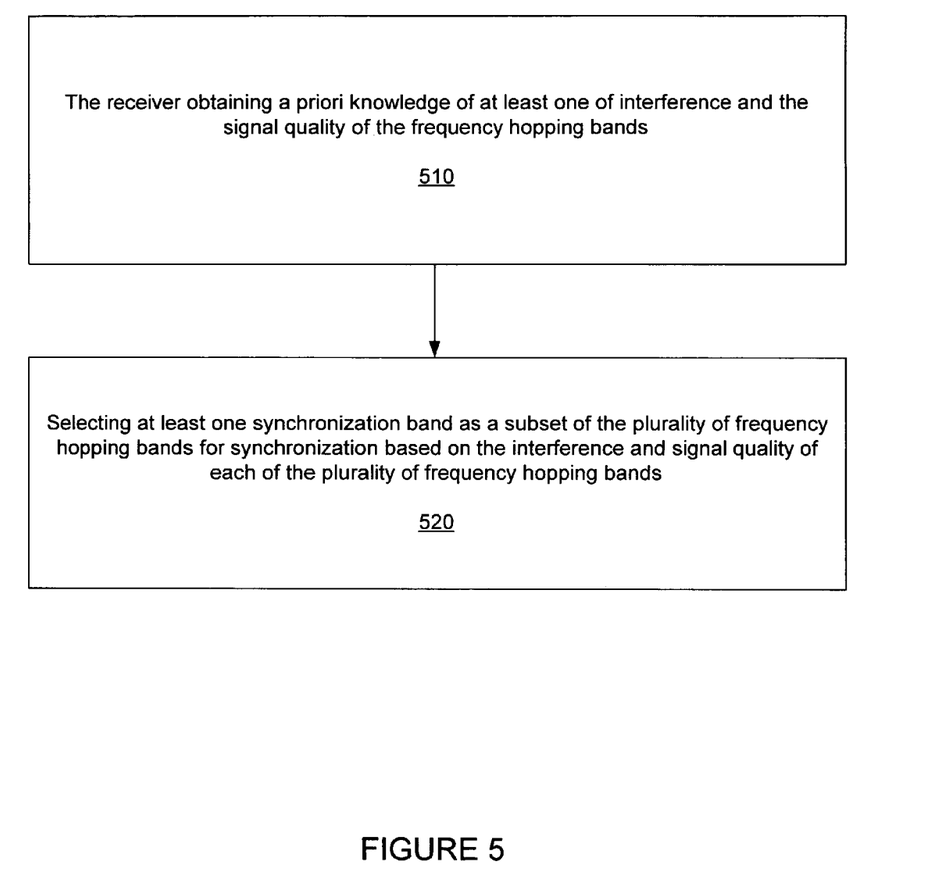
FIG. 5 is a flow chart that shows another example of steps of a method of a receiver selecting a subset of plurality of frequency hopping bands for synchronization of the receiver.

FIG. 5 is a flow chart that shows another example of steps of a method of a receiver selecting a subset of plurality of frequency hopping bands for synchronization of the receiver. A first step 510 includes the receiver obtaining a priori knowledge of at least one of interference and the signal quality of the frequency hopping bands. A second step 520 includes selecting at least one synchronization band as a subset of the plurality of frequency hopping bands for synchronization based on the interference and signal quality of each of the plurality of frequency hopping bands.

Figure 6:
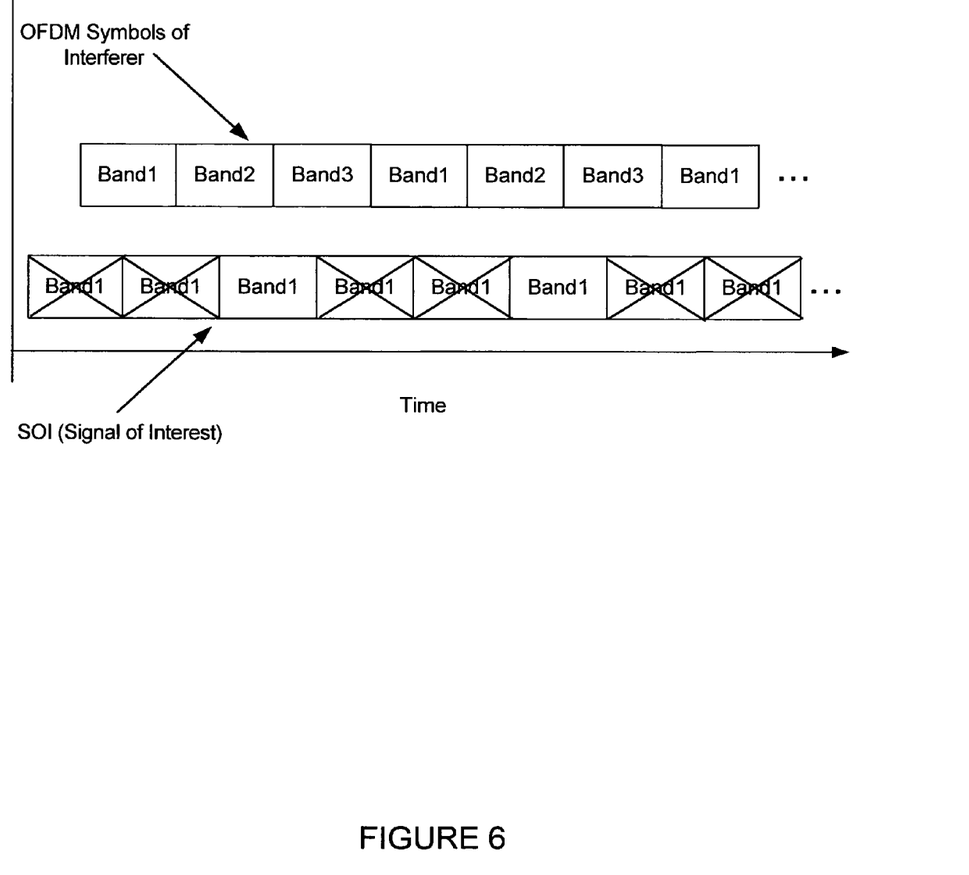
FIG. 6 shows a time-line of a SOI that includes wireless transmission of symbols over a single band, and an interfering signal that includes transmission of symbols over multiple bands (B1, B2, B3) according to a frequency hopping sequence.

FIG. 6 shows a time-line of a SOI that includes wireless transmission of symbols over a single band, and an interfering signal that includes transmission of symbols over multiple bands (B1, B2, B3) according to a frequency hopping sequence. As shown, symbols of the SOI are transmitted through a single frequency band B1, and interference can occur when the interfering signal transmits over the band B1. A receiver is more likely to obtain synchronization with the SOI if the receiver can appropriately time (that is, when the interfering signal is not transmitting in band B1) when the receiver attempts to establish synchronization. Symbols of the SOI that are interfered with by the interfering signal are indicated.

The receiver can intelligently time when it attempts to synchronize with the SOI if the receiver can characterize the pattern of the interference caused by the interfering signal. Essentially, the receiver determines the frequency hopping sequence of the interfering signal, and attempts synchronization when the interfering signal is in a non-interfering band (such as, band B2 or band B3). That way, the receiver is more likely to obtain synchronization because the interfering signal is in a different frequency band.

The receiver can establish the pattern by monitoring the band of interest (band B1) over an appropriate amount of time. The monitoring identifies the timing of when the interfering is within the frequency band of the SOI. If the interfering signal is being transmitted according to a frequency hopping sequence, then the interference is periodic, and a pattern can be established.

Once the pattern of interference has been recognized, then attempts to synchronize with the signal of interest can be timed to occur when the interfering signal is in a different frequency band. The synchronization can include sensing received symbols that occur when the interfering signal is in a different band. Once synchronization is detected for the initial received symbol(s), the timing of continued synchronization establishment can also be timed to occur during times that the interferer is in a different band as suggested by the pattern.

Figure 7:
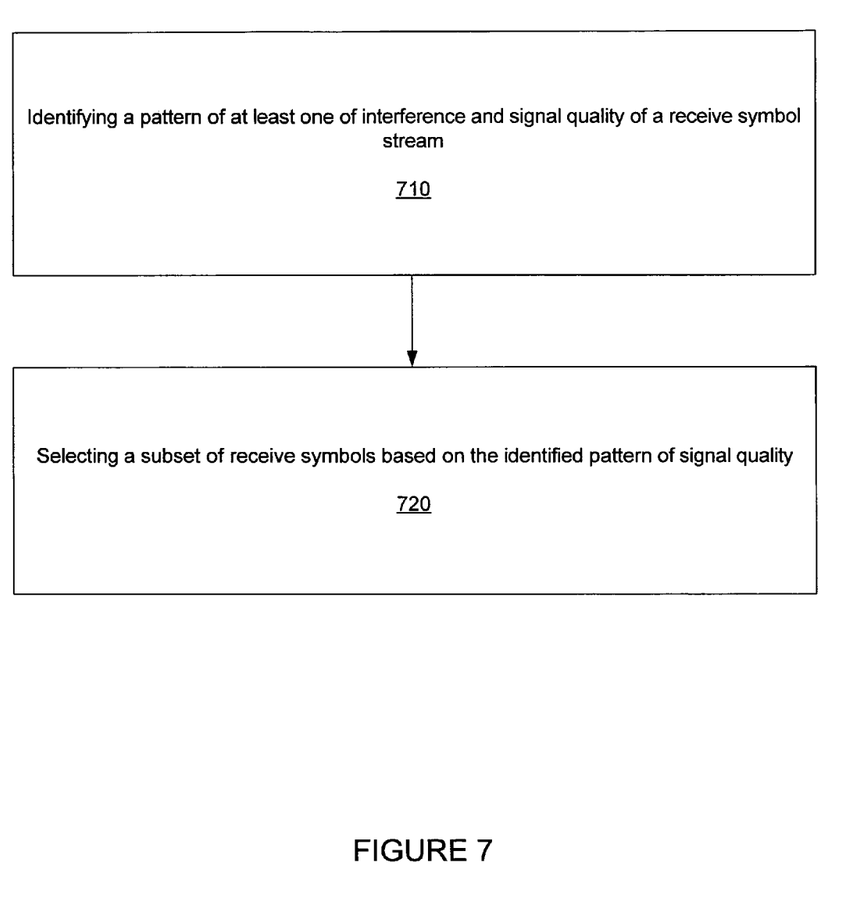
FIG. 7 shows steps of one example of a method of selecting a subset of a stream of wirelessly received symbols for a receiver establishing synchronization.

FIG. 7 shows steps of one example of a method of selecting a subset of a stream of wirelessly received symbols for a receiver establishing synchronization. A first step 710 includes identifying a pattern of at least one of interference and signal quality of a receive symbol stream. A second step 720 includes selecting a subset of receive symbols based on the identified pattern of signal quality.

Similar to the previously described embodiments, an embodiment of identifying a pattern of a signal quality of a receive symbol stream includes the receiver determining a receive signal quality metric for each band of the plurality of frequency hopping bands. Also similar to previously described embodiments, an embodiment of selecting a subset of receive symbols based on the identified pattern of signal quality includes selecting at least one synchronization band as a subset of the plurality of frequency hopping bands for synchronization based on the receive signal quality metric of each of the plurality of frequency hopping bands.

As a variation on previously described embodiment, after identifying a pattern of a signal quality of a receive symbol stream, and selecting a subset of receive symbols based on the identified pattern of signal quality, an embodiment includes detecting a receive symbol having a synchronization quality above a threshold. After the initial detection of synchronization, a subset of received symbols is monitored based on the selected subset.

Although specific embodiments have been described and illustrated, the embodiments are not to be limited to the specific forms or arrangements of parts so described and illustrated.

What is claimed:

1. A method of a receiver selecting a subset of plurality of frequency hopping bands for synchronization of the receiver, comprising: the receiver determining a receive signal quality metric for each band of the plurality of frequency hopping bands; selecting a plurality of synchronization bands as a subset of the plurality of frequency hopping bands for synchronization based on the receive signal quality metric of each of the plurality of frequency hopping bands; the receiver monitoring the selected plurality of synchronization band for a signal of interest, wherein the receiver monitoring comprises: selecting an order of the synchronization bands according to the receive signal quality metric of each of the synchronization bands; and measuring a synchronization quality metric for each of the ordered synchronization bands.

2. The method of claim 1, wherein monitoring the plurality of synchronization bands comprises monitoring a single synchronization band that has a best receive signal quality metric.

3. The method of claim 1, further comprising selecting a new plurality of synchronization bands for monitoring if the signal of interest has not been detected after a predetermined period of time.

4. The method of claim 1, wherein if a signal of interest is detected, then the receiver initiating a synchronization procedure, comprising:
the receiver hopping between bands based on timing information and a predetermined hopping sequence.

5. The method of claim 1, selecting the plurality of synchronization bands comprises selecting a subset of the frequency hopping bands having a highest quality receive signal quality metric.

6. The method of claim 1, selecting the plurality of synchronization bands comprises selecting a subset of the frequency hopping bands having a receive signal quality metric above a threshold.

7. The method of claim 1, wherein selecting the plurality of synchronization bands comprises selecting a band, wherein synchronization initiated at the band avoids a worst signal quality band.

8. The method of claim 1, further comprising:
weighting each synchronization band based on the receive signal quality metric of the synchronization band;
adjusting the synchronization quality metric for each of the ordered synchronization bands based on the weighting of each of the ordered synchronization bands;
combining the weighted synchronization quality metrics of the ordered synchronization bands;
declaring synchronization if the combined weighted synchronization quality metrics exceed a predetermined threshold.

9. The method of claim 8, wherein declaring synchronization further comprises the synchronization quality metric of each of the ordered synchronization bands exceeding an adaptive band dependent threshold.

10. The method of claim 1, wherein the receive signal quality comprises a time variance of an SINR measurement.

11. The method of claim 1, wherein the receive signal quality metric comprises a measure of channel dispersion.

12. The method of claim 11, wherein the channel dispersion measurement is of a signal of interest.

13. The method of claim 11, wherein the channel dispersion measurement is of at least one interfering signal.

14. The method of claim 1, further comprising:
adaptively selecting the plurality of synchronization band of the plurality of frequency hopping bands for synchronization based on repeated measurements of the receive signal quality metric of each of the plurality of frequency hopping bands.

15. The method of claim 1, the receiver determining a receive signal quality metric for each band of the plurality of frequency hopping bands comprises the receiver utilizing a priori knowledge of at least one of interference and the signal quality of the frequency hopping bands.

16. A method of a receiver selecting a subset of plurality of frequency hopping bands for synchronization of the receiver, comprising: the receiver obtaining a priori knowledge of at least one of interference and the signal quality of the frequency hopping bands; selecting a plurality of synchronization bands as a subset of the plurality of frequency hopping bands for synchronization based on the interference and signal quality of each of the plurality of frequency hopping bands; the receiver monitoring the selected plurality of synchronization band for a signal of interest, wherein the receiver monitoring comprises: selecting an order of the synchronization bands according to the receive signal quality metric of each of the synchronization bands; and measuring a synchronization quality metric for each of the ordered synchronization bands.

17. The method of claim 16, wherein the receiver monitoring comprises:
selecting an order of the plurality of synchronization band according to the at least one of interference and the signal quality of the frequency hopping bands;
measuring a synchronization quality metric for each of the ordered synchronization bands;
weighting each synchronization band based on the at least one of interference and the signal quality of the synchronization band;
adjusting the synchronization quality metric for each of the ordered synchronization bands based on the weighting of each of the ordered synchronization bands;
combining the weighted synchronization quality metrics of the ordered synchronization bands;
declaring synchronization if the combined weighted synchronization quality metrics exceed a predetermined threshold.

18. A method of selecting a subset of a stream of wirelessly received symbols for a receiver establishing synchronization, comprising: identifying a pattern of at least one of interference and signal quality of a receive symbol stream, wherein identifying a pattern of a signal quality of a receive symbol stream comprises the receiver determining a receive signal quality metric for each band of the plurality of frequency hopping bands, and selecting a subset of receive symbols based on the identified pattern of signal quality comprises selecting a plurality of synchronization bands as a subset of the plurality of frequency hopping bands for synchronization based on the receive signal quality metric of each of the plurality of frequency hopping bands; selecting a subset of receive symbols based on the identified pattern of at least one of interference and signal quality; the receiver monitoring the selected plurality of synchronization band for a signal of interest, wherein the receiver monitoring comprises: selecting an order of the synchronization bands according to the receive signal quality metric of each of the synchronization bands; and measuring a synchronization quality metric for each of the ordered synchronization bands.

19. The method of claim 18, further comprising:
detecting a receive symbol having a synchronization quality above a threshold; and
once detected, monitoring a subset of received symbols based on the selected subset.

20. The method of claim 19, further comprising the receiver obtaining a priori knowledge of the pattern of at least one of interference and the signal quality of a receive symbol stream.

21. The method of claim 20, further comprising:
the receiver monitoring the subset of receive symbols for a signal of interest.

* * * * *